US012676913B2

(12) United States Patent
Evans

(10) Patent No.: US 12,676,913 B2
(45) Date of Patent: Jul. 7, 2026

(54) METHODS AND APPARATUS FOR CONFIGURING A DEVICE TO READ DATA FROM A SENSOR

(71) Applicant: Vodafone Group Services Limited, Newbury (GB)

(72) Inventor: Timothy Paul Evans, Newbury (GB)

(73) Assignee: VODAFONE GROUP SERVICES LIMITED, Newbury (GB)

(*) Notice: Subject to any disclaimer, the term of this patent is extended or adjusted under 35 U.S.C. 154(b) by 23 days.

(21) Appl. No.: 18/840,869

(22) PCT Filed: Feb. 27, 2023

(86) PCT No.: PCT/GB2023/050430
§ 371 (c)(1),
(2) Date: Aug. 22, 2024

(87) PCT Pub. No.: WO2023/161652
PCT Pub. Date: Aug. 31, 2023

(65) Prior Publication Data
US 2025/0159057 A1      May 15, 2025

(30) Foreign Application Priority Data
Feb. 28, 2022      (GB) ...................................... 2202749

(51) Int. Cl.
*H04L 67/00*          (2022.01)
*H04L 67/12*          (2022.01)
(52) U.S. Cl.
CPC .............. *H04L 67/34* (2013.01); *H04L 67/12* (2013.01)

(58) Field of Classification Search
CPC .......... H04L 67/34; H04L 67/12; H04W 4/38; H04W 4/70
See application file for complete search history.

(56) References Cited

U.S. PATENT DOCUMENTS

| | | | | |
|---|---|---|---|---|
| 9,467,274 B2 * | 10/2016 | Kotecha | .................. | H04W 4/70 |
| 9,871,830 B2 * | 1/2018 | Vargheese | ........... | H04L 65/1104 |
| 2005/0240603 A1 * | 10/2005 | Bodin | .................... | G06F 16/437 |
| 2006/0143439 A1 * | 6/2006 | Arumugam | ............ | G06Q 10/08 |
| | | | | 713/153 |

(Continued)

FOREIGN PATENT DOCUMENTS

| | | | |
|---|---|---|---|
| CN | 113259888 A | 8/2021 | |
| WO | WO-2013000148 A1 * | 1/2013 | .............. H04W 4/38 |

OTHER PUBLICATIONS

International Search Report and Written Opinion received for PCT Patent Application No. PCT/GB2023/050430, mailed on Aug. 10, 2023, 12 pages.

*Primary Examiner* — Javier O Guzman
(74) *Attorney, Agent, or Firm* — Workman Nydegger

(57) ABSTRACT

A method of configuring a device to read data from a sensor is provided, the method comprising: determining that a sensor has been connected to an interface of the device and determining an address of the sensor; based on the address of the sensor, identifying a sensor type of the sensor; sending a control script to the device, wherein the control script comprises a set of instructions that, when executed by a processor of the device, causes the device to read sensor data from the sensor via the interface, wherein the set of instructions is specific to the identified sensor type of the sensor.

12 Claims, 2 Drawing Sheets

(56) References Cited

U.S. PATENT DOCUMENTS

| | | | |
|---|---|---|---|
| 2010/0145479 A1* | 6/2010 | Griffiths | H04L 67/12 |
| | | | 700/17 |
| 2010/0201542 A1* | 8/2010 | Harnett | H04L 67/12 |
| | | | 340/870.28 |
| 2012/0184209 A1* | 7/2012 | Wengrovitz | H04L 67/12 |
| | | | 709/224 |
| 2013/0007316 A1 | 1/2013 | Moon et al. | |
| 2013/0275574 A1* | 10/2013 | Hugard, IV | H04L 63/20 |
| | | | 709/224 |
| 2017/0090866 A1* | 3/2017 | Vaughn | G06F 7/02 |
| 2019/0273737 A1* | 9/2019 | Cai | H04L 63/045 |
| 2022/0345526 A1* | 10/2022 | Wang | G06F 13/102 |
| 2022/0381584 A1* | 12/2022 | VanWart | H04Q 9/00 |
| 2023/0033284 A1* | 2/2023 | Cheng | H04L 67/1008 |

* cited by examiner

METHODS AND APPARATUS FOR CONFIGURING A DEVICE TO READ DATA FROM A SENSOR

CROSS-REFERENCE TO RELATED APPLICATIONS

This application is a 371 US Nationalization of International Application No. PCT/GB2023/050430, filed Feb. 27, 2023, which claims priority from GB Patent Application No: 2202749.4, filed Feb. 28, 2022, the disclosures of which are hereby incorporated herein by reference in their entirety.

FIELD OF THE INVENTION

The present invention relates to software for flexibly interfacing with sensor devices. More specifically, the invention relates to detecting connected sensors and provisioning software for obtaining sensor data from the connected sensors in a low-power system.

BACKGROUND

New communications technologies have emerged that focus on energy efficient transmission of small, infrequent data. Using these, it is realistic to create cheap sensors and collections of sensors that communicate with remote severs (possibly across the internet) to allow collection of data or control of actuators. The data could be used by researchers, government bodies, commercial entities, consumers or private individuals to determine a wide range of parameters e.g. temperature, location, pressure flow, gas concentrations or control actuators e.g. relays, displays, locks.

The development of secure, battery efficient, reliable, cost effective devices, and systems to make best use of the available technologies is a difficult problem and requires a wide range of expertise. Currently developments making use of these emerging technologies are restricted to large organisations that are able to fund large-scale research projects with uncertain benefits and justify the associated risks. It is common for sensor devices to be constrained in the amount of data that can be communicated and the frequency at which the data may be communicated (e.g. number of times per day), so that an appropriate battery life or communication bandwidth limit for the device can be met. Such devices are also likely to have constrained memory due to cost and power drain. As these sensor devices have a communication channel, it is possible for them to be administrated from a remote server. Such a communications channel may be 3GPP NB-IoT.

It is common for sensors to communicate with a "reading device" such as a micro-processor using analogue voltage levels, pulses or through a serial bus (such as I2C, SPI, RS485 or UART) or a parallel interface. Many sensors use I2C to communicate with a processor that is local to the device. It is possible for some devices to have multiple selectable address so that multiple sensors of that type can be places on the same bus but be individually addressable. These addresses may be set using either hardware or software means depending on the sensor. It is also typical for devices to have more than one bus to communicate with sensors, to reduce interface issues and allow multiple sensors with the same I2C address to be connected to the same device.

I2C is an example of a serial bus that allows many I2C devices to be connected in parallel with each other. Each device on the I2C bus has a unique I2C address that allows it to be selected using the I2C interface alone. The I2C interface is characterised by a common basic protocol upon which a sensor/actuator specific protocol is built. This means that few, if any, sensors have the same sensor/actuator specific protocol requiring the connected device to have methods to identify and interface to each individual type of sensor.

To enable entities with less technical knowledge to create their own sensor platforms that communicate in a secure, battery efficient, reliable and cost effective way, a tested and optimised, pre-developed device/server combination is desirable. Such a device would be limited by the sensor or actuator devices known at the time of development and may require a large amount of resources (such as memory) to cope with the wide range of sensor devices that could be connected. It is therefore desirable to provide devices that collect sensor data and communicate said data in small, infrequent, secure data packets.

Development and provisioning of software and hardware for such sensors is difficult and requires not only hardware and software skills but experience in other areas such as: low power devices, device originated protocols, secure devices, Sensor communication, sensor operation, server design, system design and testing.

As each sensor requires its own specific sensor driver in the device, any developer of a common sensor platform needs to address the amount of drivers required, the memory space these drivers take up, and how to interface new devices that were not know when the device software was developed.

It is known and is possible to download firmware either at the device or over the air to manage or add new firmware to a device, thus adding the drivers for a new sensor to a device. However such a solution introduces security holes into the device that may be exploited by hackers and potentially requires significant memory and large data transmission.

SUMMARY

The present invention aims to improve on the shortcomings of the prior art. The proposed solution arms to provide a method of obtaining sensor data that is lightweight, flexible, more secure than Firmware Over The Air (FOTA) and requires very little data to be transmitted.

Prior art methods may provide scripting with more functionality and flexibility. Whilst such methods may be suitable for systems in which the scripting is processed by a computer or rechargeable battery-powered device, these methods typically use more processing resources to execute the scripts than the proposed methods and therefore consume more power. Moreover, the scripts themselves may be large in size in prior art methods.

In contrast, the proposed methods offer limited flexibility in terms of scripting capabilities, in order to reduce the complexity of the scripts. Therefore, execution of the scripts may be performed using less power. Moreover, the scripts themselves are small in size and therefore require less resources to transmit and to store, as well as to execute.

The proposed methods are therefore highly suited to environments where resources are extremely limited, such as for simple low-power sensing devices. Such devices may be positioned in a remote location to take sensor readings and then may not be easily physically accessible for maintenance. These devices may be fitted with a battery on manufacture, which is not charged or replaced throughout the life of the device (or is charged/replaced very infrequently). Moreover, the devices may comprise limited processing resources A method of reading data from a sensor is provided, wherein the sensor is selected from one or more sensors that are communicatively connected via an interface, wherein the method comprises:

processing a set of instructions, wherein the set of instructions comprises a plurality of commands and a corresponding value for each command (exactly one value).

Preferably, each command is represented by a data sequence having a first predetermined data length, wherein the corresponding value for each command is provided as a data sequence having a second predetermined data length.

In other words, the commands in the set of instructions are all the same length as each other and the values corresponding to the commands are all the same length as each other. The values may also be the same lengths as the commands (e.g. one byte). Advantageously, this simple programmatic structure enables the processor to execute the scripts using very simple low-power processing.

Preferably, the set of instructions comprises at least the following commands:

address reference to the sensor for writing data via the interface, wherein the corresponding value comprises an address of the sensor; and write data to the sensor via the interface, wherein the corresponding value comprises the data to be written to the sensor via the interface.

Preferably, the set of instructions further comprises the following commands:

address a reference to the sensor for reading data via the interface, wherein the corresponding value comprises an address of the sensor;

read data from the sensor via the interface.

In order to "address a reference to the sensor" for reading or writing data via the interface, the device may send an I2C START command via the I2C interface.

Where it is described that the corresponding value comprises "an address of the sensor" for reading or writing data, this address may comprise the interface address of the sensor and an indication of whether the operation is a read or write operation. As described elsewhere, the reference may be a one-byte address comprising the 7-bit I2C address of the sensor in the 7 MSBs and one LSB indicating whether the data operation is a read or write operation (e.g. "0" for write and "1" for read).

The set of instructions may further comprise additional addressing, writing and reading commands.

The script may comprise several consecutive write operations. The first byte written to the sensor may comprise a memory location of the sensor to which the data should be written. The subsequent bytes may comprise the data to be written to that memory location. Likewise, data may be read from different memory locations on the sensor. Prior to initiating a read operation, a script may write to the sensor to provide a memory address, thereby selecting the memory address from which data will be read in the read operation.

Most scripts will be used for reading from an I2C sensor. In this case, the script will comprise a write operation (to cause the sensor to write data over the I2C interface) and a read operation. However, it may be possible for a script to just have an action such as a delay or clear a buffer.

It is also possible that the sensor is only written to (to start a reading for instance or to re-configure the sensor). In this case, no read commands would be present in the script (but write commands would be present).

The set of instructions preferably comprises a command portion comprising the plurality of commands and a command value portion comprising the corresponding values for the plurality of commands, wherein a data length of the command portion is equal to a data length of the corresponding command value portion.

The set of instructions preferably comprises a plurality of bytes, wherein each command in the set of instructions is represented by exactly one byte, wherein the corresponding value of each command comprises exactly one byte.

It is an objective of the methods described to provide a simple method for executing scripts that enable the device to read data from one or more sensors via an interface (such as an I2C interface) or control one or more parameters of a sensor or actuator. The proposed methods aim to keep the power consumption of the device low by providing only limited functionality so that the device can execute the scripts with limited processing and memory resources.

The plurality of commands are preferably provided in a defined order and the method preferably comprises executing the commands in the defined order.

The read command preferably comprises a corresponding value that is either:

a) null data (e.g. all 0s); or b) a length of the data to be read via the interface.

Where the corresponding value is all zeroes, a length of the null data is equal to a length of the data to be read via the interface (fixed at the second predetermined data length).

Where the corresponding value is a length of the data to be read via the interface, the length may be provided in terms of a number of data units, where one data unit is equal to the second predetermined data length.

Where the read command comprises a corresponding value that is null data, the set of instructions preferably further comprises one or more further consecutive commands to read data from the sensor via the interface, wherein a length of the data to be read via the interface is defined by the number of consecutive read commands.

The one or more sensors are preferably connected in parallel to the interface.

The interface is preferably a 2-line bus interface, wherein data is read and written serially to and from the one or more sensors via the interface.

The interface is preferably an Inter-Integrated Circuit, I2C, interface.

The method preferably further comprises executing a control sequence, wherein the control sequence comprises:

an address of the sensor on the interface; and a memory location of the set of instructions.

The method preferably further comprises retrieving the set of instructions from the memory location.

The memory location preferably comprises a slot number and a script number.

The interface is preferably one interface selected from a plurality of interfaces, wherein the control sequence further comprises an identifier of the selected interface.

Some sensors may have a preconfigured address on the configurable. In this case, it is only possible to connect one sensor having this address to an interface, as the sensors would otherwise not be individually addressable. Therefore, providing a second interface may provide more flexibility as the device is able to support two sensors on different interfaces that could not be addressed uniquely if they shared an interface.

The method preferably further comprises transmitting data over a data connection to a remote server, wherein the data transmitted over the data connection comprises the data read from the sensor via the interface.

The instructions preferably further comprise one or more of the following commands:

address a reference to the sensor for writing data via the interface, wherein the corresponding value comprises an address of the sensor (this command may cause the device to send an I2C START command on the I2C interface);

write data to the addressed sensor via the interface, wherein the corresponding value comprises the data to be written to the sensor via the interface;

address a reference to the sensor for reading data via the interface, wherein the corresponding value comprises an address (this command may cause the device to send an I2C START command on the I2C interface);

read data from the addressed sensor via the interface and store the read data for transmitting to a remote server via a data connection;

read data from the addressed sensor via the interface and do not store the read data;

store a data value for transmitting to a remote server via a data connection, wherein the corresponding value comprises the data to be stored and transmitted to the remote server;

wait for a period of time before proceeding with the next command in the set of instructions, wherein the period of time comprises a number of intervals of predetermined duration, wherein the corresponding value of the command comprises the number of intervals to wait (this command may cause the device to send an I2C STOP command on the I2C interface);

loop over a first subset of commands of the set of commands, wherein the corresponding value comprises a number of times to execute the first subset of commands, wherein the subset of commands begins immediately after the loop command;

define an end of the loop, wherein the subset of commands ends immediately before the end of loop command;

perform a comparison and execute a second subset of commands of the set of commands or break out of a current loop if a predetermined condition is met, wherein the corresponding value defines the predetermined condition, wherein the predetermined condition is selected from:

a first number is equal to a second number, a first number is not equal to a second number, a first number is greater than a second number (this comparison may be a signed or unsigned test), and a first number is less than a second number (this comparison may be a signed or unsigned test), wherein the first number and the second number are defined in a subsequent command;

read data from the sensor via the interface and use the data as the first number in the comparison, wherein the corresponding value defines the second number in the comparison;

modify the first number in the comparison by performing a predetermined operation on the first number and a third number, wherein the predetermined operation is selected from:

bitwise AND the first number with the third number, bitwise OR the first number with the third number, bitwise XOR the first number with the third number, wherein the third number is defined in a subsequent command;

read data from the sensor via the interface and use the data as the third number to modify the first number in the comparison;

read data from the sensor via the interface and ignore the read data;

define a start of the second subset of commands, wherein the second subset of commands begins immediately after the define command;

define an end of the second subset of commands, wherein the second subset of commands ends immediately before the define command;

force the script to terminate, without executing subsequent commands;

read data from the sensor via the interface and store the read data in a memory buffer, wherein the corresponding value is an address of the memory buffer;

write data from a memory buffer to the sensor via the interface, wherein the corresponding value comprises an address of the memory buffer; and clear a memory buffer, wherein the corresponding value comprises an address of the memory buffer to clear.

A device is also provided, the device comprising:

a processor configured to perform the method of any preceding claim; and one or more sensors connected to the processor via the interface.

The device preferably further comprises an antenna for transmitting data via a cellular network to a remote server.

The device preferably further comprises a battery and/or solar panel.

A method of controlling an actuator is provided, wherein the actuator is selected from one or more actuators and/or sensors that are communicatively connected via an interface, wherein the method comprises:

processing a set of instructions, wherein the set of instructions comprises a plurality of commands and a corresponding value for each command, wherein the set of instructions comprises at least the following commands:

address a reference to the actuator for writing data via the interface, wherein the corresponding value comprises an address of the actuator;

write data to the actuator via the interface, wherein the corresponding value comprises the data to be written to the actuator via the interface, wherein each command is represented by a data sequence having a first predetermined data length, wherein the corresponding value for each command is provided as a data sequence having a second predetermined data length.

As will be appreciated by the skilled person, optional features described in relation to the method of reading data from a sensor described above may be equally applicable to the method of controlling an actuator.

It is also particularly problematic for integrators to interface with many different I2C sensors because there is no consistent way in which the information regarding sensor operation is made available (e.g. on component datasheets). Ideally the integrator should be able to simply attach a sensor to a device and for the device ether by itself or together with a remote server, self configure itself for that sensor.

A method of configuring a device to read data from a sensor is provided. The method may be performed by server that is remote from the device. The method comprises:

determining that a sensor has been connected to an interface of the device and determining an address of the sensor;

based on the address of the sensor, identifying a sensor type of the sensor;

sending a control script to the device, wherein the control script comprises a set of instructions that, when executed by a processor of the device, causes the device to read sensor data from the sensor via the interface, wherein the set of instructions is specific to the identified sensor type of the sensor.

Advantageously, the proposed configuration methods allow users to add sensors to device interfaces so that sensor data may be gathered. Appropriate control scripts may be sent to the server so that the sensor may be operated appropriately (according to the sensor specifications set out in the datasheet). Provision of a suitable control script may be achieved automatically, without the need for the user to manually install drivers on the devices. This can therefore be performed without requiring a wired connection to a computer. Therefore, sensors can be added to a device, without removing the device from its position in the environment (which may be fixed once the device is deployed).

Identifying a sensor type of the sensor preferably comprises:

based on the address of the sensor, determining one or more possible candidate sensor types of the sensor;

if the one or more possible candidate sensor types consists of exactly one candidate sensor type, determining that the sensor type of the sensor is the exactly one candidate sensor type;

if the one or more possible candidate sensor types comprises a plurality of candidate sensor types, selecting a candidate sensor type of the plurality of candidate sensor types and:

a) sending a test script to the device, wherein the test script comprises a set of instructions that, when executed by a processor of the device, causes the device to read data (such as identifying data) from the sensor via the interface, wherein the set of instructions is specific to sensors of the selected candidate sensor type;

b) receiving data from the device, wherein the data is read from the sensor by the device during execution of the test script;

c) based on the data read from the sensor during execution of the test script, determining whether the sensor type of the sensor is the selected candidate sensor type, d) selecting different candidate sensor types from the plurality of candidate sensor types and repeating steps a) to c) until the sensor type of the sensor has been identified.

Determining that a sensor has been connected to the interface preferably comprises:

receiving a first list of addresses of one or more sensors connected to the device via the interface at a first time;

receiving a second list of addresses of one or more sensors connected to the device via the interface at a second time; and comparing the first and second lists of addresses to determine that a sensor has been connected to the interface between the first time and the second time.

The method preferably further comprises:

receiving the sensor data from the device; and performing data processing on the sensor data, wherein the processing is specific to the identified sensor type of the sensor.

The server may receive sensor data from the device that is generated as a result of execution of the control script by the device. The server may process the data according to the specific sensor type (which is known by the server as the server sent the control script to the device and is aware of the sensor address, interface identifier, identifying data for the particular device, etc.).

A method of configuring a device to read data from a sensor is provided. The method may be performed the device. The device comprises an interface, wherein one or more sensors are connected to the device via the interface, the method comprising:

providing an indication of one or more sensors connected to the device via the interface to a remote server;

receiving a control script from the remote server, wherein the control script comprises a set of instructions that, when executed by a processor of the device, causes the device to read sensor data from the sensor via the interface, wherein the set of instructions is specific to a sensor type of the sensor.

Preferably, the method further comprises a) receiving a test script from the remote server, wherein the test script comprises a set of instructions that, when executed by a processor of the device, causes the device to read data from the sensor via the interface;

b) executing the test script so that data is read from the sensor via the interface; and c) sending the data to the remote server.

Preferably, the method further comprises repeating steps a) to c) for a plurality of different test scripts received from the remote server.

Providing an indication of one or more sensors connected to the device via the interface to a remote server preferably comprises:

i) sending a polling message via the interface to the one or more sensors connected to the device via the interface;

ii) receiving addresses of the one or more sensors connected to the device via the interface; and iii) sending a list of the address of the one or more sensors connected to the device via the interface to the remote server.

Preferably, steps i) to iii) are performed at a first time to provide a first list of addresses of one or more sensors connected to the device via the interface, and steps i) to iii) are preferably further performed at a second time to provide a second list of addresses of one or more sensors connected to the device via the interface.

The method preferably further comprises:

executing the control script so that sensor data is read from the sensor via the interface; and sending the sensor data to the remote server.

A server configured to perform the methods described above is also provided.

A device is also provided. The device comprises:

a processor; and an interface, communicatively coupled to the processor configured to be one or more sensors. The device is configured to perform the methods described above.

A system is also provided. The system comprises:

one or more a devices as described above; and a server as described above, wherein the server is remote form the devices and in communication with the devices via a network (such as a wide area network or mobile cellular network).

A method of controlling an actuator is provided, wherein the actuator is selected from one or more actuators and/or sensors that are communicatively connected via an interface, wherein the method comprises:

processing a set of instructions, wherein the set of instructions comprises a plurality of commands and a corresponding value for each command, wherein the set of instructions comprises at least the following commands:

address a reference to the actuator for writing data via the interface, wherein the corresponding value comprises an address of the actuator;

write data to the actuator via the interface, wherein the corresponding value comprises the data to be written to the actuator via the interface, wherein each command is represented by a data sequence having a first predetermined data length, wherein the corresponding value for each command is provided as a data sequence having a second predetermined data length.

As will be appreciated by the skilled person, optional features described in relation to the method of reading data from a sensor described above may be equally applicable to the method of controlling an actuator.

A method of configuring a device to control an actuator is provided. The method may be performed by server that is remote from the device. The method comprises:

determining that an actuator has been connected to an interface of the device and determining an address of the actuator;

based on the address of the actuator, identifying an actuator type of the actuator;

sending a control script to the device, wherein the control script comprises a set of instructions that, when executed by a processor of the device, causes the device to control the actuator via the interface, wherein the set of instructions is specific to the identified actuator type of the actuator.

A method of configuring a device to control an actuator is provided. The method may be performed the device. The device comprises an interface, wherein one or more actuators are connected to the device via the interface, the method comprising:

providing an indication of one or more actuators connected to the device via the interface to a remote server;

receiving a control script from the remote server, wherein the control script comprises a set of instructions that, when executed by a processor of the device, causes the device to control the actuator via the interface, wherein the set of instructions is specific to an actuator type of the actuator.

As will be appreciated by the skilled person, optional features described in relation to the methods of configuring a device to read data from a sensor described above may be equally applicable to the methods of configuring a device to control an actuator.

BRIEF DESCRIPTION OF THE DRAWINGS

The present invention will now be described with reference to the following drawings that illustrate non-limiting examples.

DETAILED DESCRIPTION

The invention relates to a remote sensing device. The device is intended to be low power so that the battery of the device does not need replacing/recharging for long periods of time (perhaps 15 years, in which time the battery may naturally degrade in any case). The device may be simple and flexible so that numerous devices may be deployed to gather large quantities of sensor data. Possible use cases for the device include:

Detecting and predicting landslip (e.g. on cliffs in coastal locations). Possible sensors may include environmental and geological sensors, such as:

Wind

Rainfall

Temperature

Tilt

Vibration

Water

Distance

Agricultural monitoring. Possible sensors may include soil sensors, water sensors botanical sensors and equipment sensors, such as:

Trunk size sensors for measuring tree growth

Motion and location sensors for securing farm equipment

Water and chemical fertiliser sensors for monitoring soil quality

Figure 1:
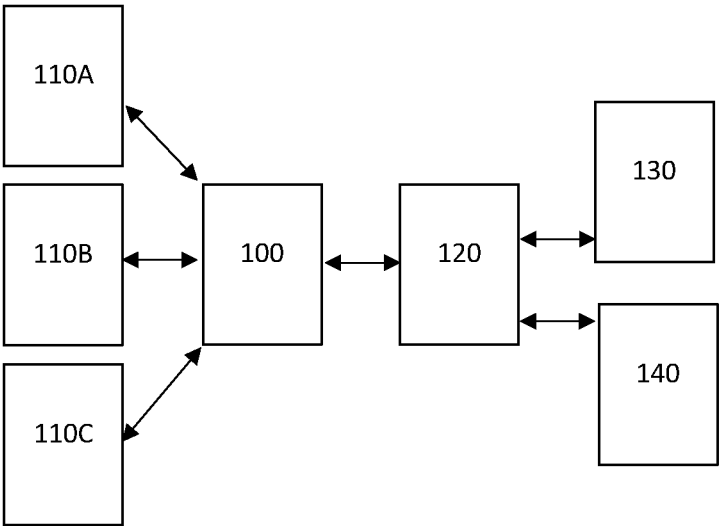
FIG. 1 illustrates a system for collecting sensor data using a device.

Water level and water quality sensors for measuring runoff into rivers and other water channels FIG. 1 illustrates a system for collecting sensor data using device 100. One or more sensors 110A, 110B, 110C are connected to the device 100 and are in communication with the device 100 via an interface. The sensors may be connected in parallel via the interface.

The device 100 may exchange data with a remote server 120 via a cellular network. The device 100 may send sensor data to the remote server and receive configuration data from the remote server via a range of different protocols. The device and the server preferably exchange data via User Datagram Protocol (UDP) and using Narrowband Internet of things (NB-IoT) radio technology. The remote server may be responsible for data storage and processing, as well as configuring the devices that are connected.

A user may access the remote server to configure the device and access the sensor data via a web portal 130 in communication with the remote server. The user may access the remote server programmatically via a representational state transfer application programming interface (REST API) 140. The REST API may be provided via HTTPS over TCP/IP.

Only one device is illustrated in FIG. 1. However, in reality there will be a large number of devices connected to the remote server and the remote server will be responsible for configuring and processing data from all of the devices.

Figure 2:
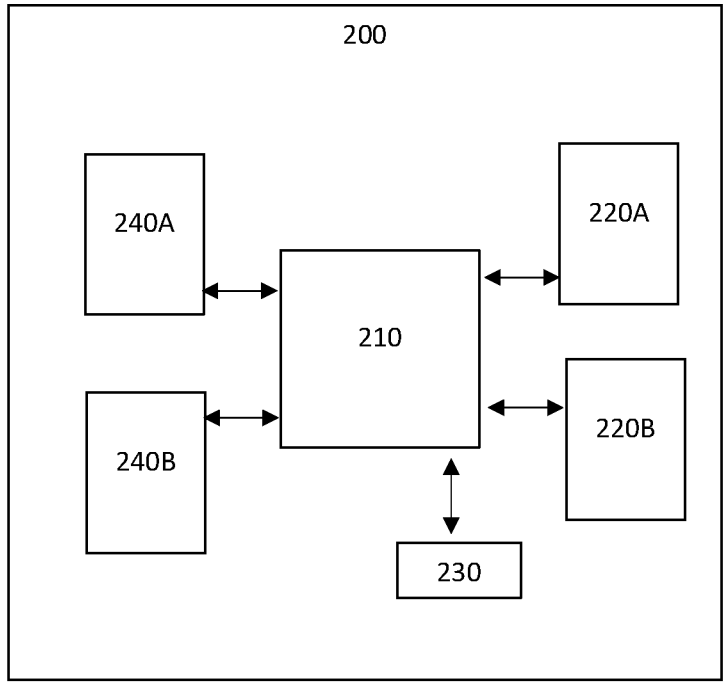
FIG. 2 illustrates a schematic diagram of a device for collecting sensor data.

FIG. 2 illustrates a schematic diagram of a device for collecting sensor data. The device comprises a processor 210 and one or more interfaces 220A, 220B. The interfaces 220A, 220B may be I2C busses. The device further comprises an antenna 230 for communicating via a mobile cellular network. The device further comprises one or more power terminals 240A, 240B. The device may be supplied with mains power via one of the power terminals. The device may be powered by a battery connected to one of the terminals. The device may be powered by a solar panel connected via one of the power terminals. The device may be connected to a solar panel and a battery and the battery may only be needed when the power available from the solar panel is insufficient to power the device.

To provide a simple, flexible and low-power device, the device comprises:

A processor; and

An interface for connecting one or more sensors and/or one or more actuators.

The size of the device may be around 4 cm by 5 cm. The interface may be an I2C interface supporting analogue and digital sensors. The I2C interface may further support a range of actuators (e.g. digital actuators). To transmit the collected data to a remote server, the device may further comprise an antenna to enable the device to communicate via a cellular network. For example, the device may communicate with a remote server using a Narrowband Internet of Things (NB-IoT) radio technology. The device may communicate using an Open Mobile Alliance (OMA) lightweight machine-to-machine (LwM2M) protocol.

The device may further comprise a battery (such as a LiPo battery) and/or a mains power supply. To further extend the operational lifespan of the device, a solar panel may further be provided. This may be suitable for some use cases but not others.

Large numbers of devices may be deployed and managed remotely using a device management platform. A web portal and/or application programming interface (API) may be provided to manage the devices. Via the web portal and/or API, a user may be able to manage device settings, collect and view data, group devices, and set custom actions based on sensor values.

By providing simple devices, a user may be able to deploy large numbers of sensors into a managed environment to collect data. The data may be used to determine strategies for managing the environment or may be used to manage the environment in real-time.

Because the devices are simple, they may also be relatively low-cost. This may allow users to deploy many sensing devices that can provide data readings over many years for the same cost as sending one soil or rock sample to a lab, for example. The device therefore greatly improves the quantity of data that can be reasonable collected in the managed environment.

In order to provide a simple device, the types of sensor that the device supports are advantageously highly flexible. The device includes an interface to which any sensor can be connected, as long as the sensor supports the interface protocol. Preferably, the interface is an I2C interface but alternative/additional interfaces may be provided on the device.

Sensor Operation and Scripting

In order to support various different sensor devices, it is required to provide a method of controlling the sensors so that data from the sensors can be obtained by the processor of the device. The data may be processed locally on the device and/or may be transmitted to a remote server.

Prior art devices require that sensor drivers are installed on the device so that sensor data may be read effectively from the device. However, this system is not suitable for the lightweight devices proposed as the sensor drivers may be relatively complex. This may be because they are intended to include many features and use all possible functions of the sensor and error reporting capabilities. These complex drivers may take up large amounts of data storage on the device and may require considerable processing resources to execute in order to obtain sensor data. Moreover, the drivers may need to be downloaded to the device, which can take a long time or be infeasible over the lightweight narrowband communications protocols over which the devices are designed to communicate.

There is therefore a need to provide a method of reading sensor data from sensors connected to the device via the interface, without using the complex drivers. The method should be suitable for use with any sensor and should therefore be customisable using lightweight scripts that may be tailored to each sensor. The scripts may be designed to provide the minimum functionality required, without any unnecessary features.

In order to implement custom scripts, the device may be programmed to recognise a limited set of commands so that the sensors may be operated by the device via the interface. In this way, the device may read sensor data from the sensors. The set of commands may be small enough that each command in the script may be invoked using a small quantity of data. For example, each command may be represented in the script using a single byte of data (and hence the number of commands may be limited to a maximum of 255). The commands may be encoded as ASCII characters, to improve human readability of the scripts. Therefore the actual number of commands available may be limited to the 95 printable ASCII characters.

Each command in the script may be accompanied by a corresponding value. By defining that each command is a fixed size (e.g. 1 byte) and has a corresponding value that is also a fixed size (e.g. 1 byte) a very simple scripting platform may be provided. Commands that require inputs of variable lengths or more than one input value are not explicitly supported. Such commands may be implemented through the use of command combinations.

As a result, the scripts may be considerably smaller than the sensor drivers and the technical requirements of the device may be reduced considerably, while providing all required functionality.

As described above, a compact scripting language and configurations are provided as a means to allow a device to communicate with a connected I2C sensor or actuator. The I2C sensor may be connected on a specific bus. Readings from the sensor may be triggered based on a specific event. The scripting language comprises transmission information, trigger event, I2C operation, script commands (control mask), and corresponding data values. The device may be able to use the same script for the same type of devices at other I2C addresses or connected to other I2C buses.

A configuration protocol may be provided between the device and the remote server. This may allow the server to update I2C scripts and how they apply to sensors connected to the device.

The server may comprise a means of creating and sending suitable I2C scripts that allow a device to communicate with a sensor.

The device may comprise one or more I2C buses and memory areas that define one off actions, repeating actions, storage areas for multiple I2C scripts and programmed to interpret these into I2C commands to be sent or read from connected sensors.

To save space on the device these scripts could be encoded so that multiple scripts could be stored in each storage area.

In the specific example provided, each script has the following format:

Tag (1 byte)

Length=x (1 byte)

returned data type (1 byte)

data units (1 byte)

transported data format (1 byte)

Encoded commands ((x-5)/2 bytes)

Encoded command values ((x-5)/2 bytes)

where the Encoded commands mask consists of Hex values representing ASCII characters, where each character is mapped to a specific command as described below.

The system tag defines how the script is used. Different tags may be used in different parts of the design. For instance Ax tags may be used in responses from the server. In many cases relevant to this application, the value "10" in hex defines that the value part is an I2C script. Other scripts may be used to invoke other device functionality.

Since the length of the script is provided in the header and is limited to one byte, the maximum supported length of script is therefore 255 bytes. The bytes may be counted as the number of bytes after the length byte (so ignoring the tag and length bytes but including the data type, units and format bytes). In other words, the length is only is the length of the value part of the TLV (Tag–Length–Value). The maximum number of commands is therefore (255-3)/2=126 commands.

The "data units" byte defines the units that the read value is in, as an indication to the server as to what units to display and as a means to differentiate between different readings from the same sensor. E.g. x degrees, y degrees, z degrees, for an accelerometer or temperature in degrees for a temperature sensor.

| Encoded commands | |
|---|---|
| ASCII Character | Command |
| A | write address (can be substituted for real I2C address by device) (Cause an I2C START to be sent) |
| W | write byte |
| a | read address (can be substituted for real I2C address by device) (Cause an I2C START to be sent) |
| r | read byte into return result: the value part indicates how many sequential bytes to read and return (for example r4 is the same as rrrr0000). |
| i | read byte but don't record it in return result the value part indicates how many sequential bytes to read and ignore (for example i4 is the same as iiii0000). |
| F | return a fixed value in the result (does not cause a i2c stop) |
| M | wait (number of 10 ms to wait e.g. 02 = 20 ms) (cause an I2C STOP to be sent) |
| S | number of Seconds to wait (cause an I2C STOP to be sent) |
| [ | Loop x times. The [ character marks the beginning of a loop. The number of times the loop is carried out is provided in the corresponding value portion and as defined as follows: 01 - 7F loop that many times, F0: loop a number of times equal to a value stored in buffer 00, F1: buffer 01, F2: buffer 02, F3: buffer 10, F4: buffer 11, F5: buffer 12, F6: buffer 20, F7: buffer 21, F8: buffer 22 loops cannot be nested |
| ] | end of loop marker |
| T | Start of test and type of test (actual test values are provided in subsequent commands (c, C, &, \|, x or v masks) that define the test). A valid test result (a Boolean true result) ends a loop. The corresponding value of the test command defines what to do if the test is true. If the test is false, the script continues as normal. Supported types are: 00 - jump to ( if return result matches the c value 01 - jump to { if return result matches the c value 02 - end loop if return result matches the c value 10 - jump to ( if return result does not match the c value 11 - jump to { if return result does not match the c value 12 - end loop if return result does not match the c value 20 - jump to ( if return result is greater than c value (unsigned test) 21 - jump to { if return result is greater than c value (unsigned test) 22 - end loop if return result is greater than c value (unsigned test) 30 - jump to ( if return result is greater than c value (signed test) 31 - jump to { if return result is greater than c value (signed test) 32 - end loop if return result is greater than c value (signed test) 40 - jump to ( if return result is less than c value (unsigned test) 41 - jump to { if return result is less than c value (unsigned test) 42 - end loop if return result is less than c value (unsigned test) 50 - jump to ( if return result is less than c value (signed test) 51 - jump to { if return result is less than c value (signed test) 52 - end loop if return result is less than c value (signed test) |

-continued

| Encoded commands | |
|---|---|

| ASCII Character | Command |
|---|---|
| C | read byte and test it against the first byte of a buffer where the value given is the buffer number. If the buffer number is invalid, then the script terminates with an error. |
| c | read byte and test it against the value given (the read value may be modified by preceding &, \| or x values) - consecutive c's and v's are treated as one test |
| v | read a value but ignore it as part of the tested value (&, \| or x values do not apply to this) |
| & | AND the value with the following c value (c must be the next mask character or no effect). AND operations are performed bitwise |
| \| | OR the value with the following c value (c must be the next mask character or no effect). OR operations are performed bitwise |
| x | Exclusive OR the value with the following c value (c must be the next mask character or no effect). XOR operations are performed bitwise |
| ( | start of conditional i2c command (ignore between ( and ) if not a test jump |
| ) | end of i2c conditional command |
| { | start of conditional i2c command (ignore between { and } if not a test jump. The corresponding value part is ignored. |
| } | end of i2c conditional command |
| E | force end of I2C command. The corresponding value part is ignored. |
| b | read byte to buffer overwriting the current buffer value (Value is the relevant buffers). Each buffer may contain a single byte hex value. The scope of the buffer (how long the value is stored for) depends on the range that the buffer is in, as follows: Buffers 00 to 0F - These buffers clear to the default buffer value at the end of the script that they are used in. Buffers 10 to 1F - These buffers clear to the default buffer value at the end of the current readings cycle. Buffers 20 to 2F - These buffers clear to the default buffer value after a successful data transmission to the server. Buffers 30 to FF - These buffers are stored permanently. |
| B | write Buffer value to I2C interface (value is relevant buffer address) |
| K | clear buffer to the default buffer value (value is buffer to clear - FF is all buffers) |
| D | default Buffer value if buffer empty (if no D has been issued then the default Buffer value is 00) |

For the definitions provided above, ( ) cannot be nested within ( ) and { } cannot be nested within { }. However, ( ) can be nested within { } and vice-versa. The corresponding value part is ignored.

Alternatively, a corresponding value could be provided with each "(" or "{" and corresponding ")" or "}". This value could be used as a label to indicate which "(" relates to which ")". This may enable nesting of further sets of ( ) and { }.

Clearing a buffer value may be used to change the buffer value in a fixed way (instead of a read value). This may be needed for security or privacy reasons, or to set a lifetime for the value in a buffer (clear it when it is no longer valid).

As described above, each command is represented by exactly one byte and has an associated value of exactly one byte. Therefore, the functionality is limited to a maximum of 256 possible commands. As described above, scripts to read sensor data from a sensor may be designed using the 26 commands described above. There is therefore scope to add commands to enhance functionality in future, without compromising the scripting structure.

Whilst, the scripting structure is restricted to one value per command (one byte), the scripts provide the ability to read and write different lengths of data to/from the sensor and memory buffers. The length of data written via the interface and data read via the interface is configurable by adding a custom number of write commands to the script.

Example 1—Read Light Sensor Value

In this example, a script is provided to read white spectrum light (from a vemI7700 light sensor) with a 100 ms pause.

The specific sensor (vemI7700 light sensor) has an I2C address of 10, which gives a write I2C address of 20 hex and a read I2C address of 21 hex. It is configured for a specific reading setting by setting the configuration register (00 hex) to a value of 0000 hex. Then, after a 100 ms pause during which the device powers on, a value of 05 hex is written to the VMEL7700 I2C write address 20 hex to instruct the device to return the White Channel Output Data sensor reading (as defined in the data sheet of the vemI7700 light sensor). The output is two bytes so the final command is to read two bytes from the VMEL7700 I2C read address 21 hex, via the I2C interface.

The ASCII Mask for the commands is therefore:
A W W W M A W a r r

Which is encoded in hexadecimal (using standard ASCII character encoding) as:
415757574D4157617272

The corresponding string comprising the values for each command is:
200000000A2005210000

For this specific example, each script is assigned a Tag of "10". The length of the script=23 bytes (0x17). Returned data type=64, which indicates that the data is returned as "raw" data. Data units=5 (light in lux). Transported data format=04 (hex value). As described above, Encoded Mask=415757574D4157617272 and Encoded command=200000000A2005210000. Therefore, the complete string to return raw light sensor value to server is:

10176405044157575 74D415761727220000000
        0A2005210000

To use this script, a control area (such as repeating scripts or one off script actions) is programmed with a number of control sequences. Each control sequence is provided as three bytes and follows the following structure:

First byte: I2C Address
    Second byte: Upper nibble: I2C Bus
    Second byte: Lower nibble: I2C Slot Number
    Third byte: I2C script number The I2C address is a 7 bit number but is provided as 1 byte. Therefore, the leading bit should be a 0. There may be special meanings if the first bit is a 1. For example, AA may mean that the script is for a non I2C bus item configured separately.

The address of the sensor on the I2C interface is "10" (as a 7 bit number).

So for a light sensor using "10" as the default address, connected to bus 1 with the above script as the 3rd script in slot 4, the command would be:

101403

In this example the whole driver for that specific light sensor takes up only 28 bytes (25 bytes of script and 3 bytes of control sequence) and if several vemI7700 light sensors were connected that additional ones would only consume a further 3 bytes each.

As described above, the read and write addresses may be substituted for real I2C address by the device. The script may be used to communicate with a device at any I2C address on the I2C interface. The actual address is defined in a control sequence. Therefore, whilst the A (write address) and a (read address) commands require an address as their corresponding value, these values may be overwritten by the device based on the I2C address, once this is known at runtime. For example, if the control sequence is 101403, the I2C address is 0x10, which is made up of a leading 0 and a 7-bit I2C address 001000. To determine the corresponding read/write address, a least significant bit (LSB) is appended to the I2C address where "0" is appended for a write address and "1" is appended for a read address. Therefore, the read and write addresses are 0010000 (0x20) and 0010001 (0x21), respectively.

For comparison, if the same script were run for a device at 7-bit I2C address, 1000100, the control sequence would be 441403 and the read and write addresses would be 10001000 (0x88) and 10001001 (0x89), respectively. These addresses may be substituted for the addresses provided in the values corresponding to the "A" and "a" commands at runtime.

Example 2—Read Nitrogen Sensor Value

In the following example reads the nitrogen value of a sensor when the reading is available. The script writes to the trigger measurement register on a sensor that is at I2C address 6C to trigger a measurement Do a reading sensor 1 (write to register 0x03) and ignore the resulting read. The script then waits 6 seconds and then loops upto 16 times. Within the loop the script reads the status register to see if a valid measurement is available. The read value of the status register (0x07) is AND'ed with 0x01 to only check the specific bit that means the reading is ready. If the test is true (bit 0 of the 4$^{th}$ byte set to 0) then the test causes the loop to finish and the script after "(" to be started, if the test fails (because the reading is not ready) then the rest of the script in the loop id carried out (a pause of 1 second).

The ascii mask for this example would be:

A W M a i S [A W a i T & c S] E { A W a i r)

Which is encoded in hexadecimal (using standard ASCII character encoding) as:

41574D6169535B41576169542663535D45
        7B415761697229

The corresponding string comprising the values for each command is:

D80302D9040610D807D903010101
        01000000D810D9020200

The header for this command would be:

Tag=10 hex
    Length=32 Hex (50 bytes)
    Returned data type=64 Hex (raw I2C value)
    Data Units=10 hex (10=NPK sensor 1–N (Nitrogen) in mg of N/Kg of soil)
    Meaning the final I2C script would be:
    1032641041574D6169535B4157616954
        2663535D457B415761697229D80302D9040
        610D807D90301010101000000D810D9020200

Sensor Detection and Device Provisioning

As described above, the device may provide a flexible scripting mechanism to control the sensors via the interface. Each sensor may be different and the scripts may be manually created to obtain the appropriate sensor data. For example, the way in which each sensor is initially configured and the way in which the sensor is prompted to write sensor data over the interface may be different for each sensor. Moreover, the format of the data that is output by the sensor may be different in each case (e.g. a particular number of bytes). Therefore, each sensor connected to the interface of the device may be controlled using a bespoke script.

In order to determine what scripts are required on the device to control the sensors, it is necessary to determine what sensors are connected to the device. It may be possible for a user to manually add scripts to the device, based on what sensors they have connected to the interface of the device. However, it is desired that the device should be operable by users that are not familiar with device configuration and so automatic provisioning of suitable scripts to the device to control the sensors is desirable.

As described above, the device may be capable of hosting sensors either by serial interfaces such as Inter IC (I2C), I3C, SCSI Parallel Interface (SPI) or universal asynchronous receiver-transmitter (UART), by digital interfaces such as Transistor-Transistor Logic (TTL) and/or by analogue interfaces. The device may have a means to communicate in a secure, compact way with a remote server (e.g. by a public WAN technology such as NB-IoT). The server may co-operate in the setting up of newly attached or detached sensors and will be able to interpret the sensor data sent from the device.

In a specific example, a new I2C sensor may be added to an already operational device and automatically configured to read data from the new sensor and send it to the server. The new sensor may be configured to take sensor readings and send them to the server at a default frequency (having predetermined periods of time between readings).

To initiate the configuration process, a user attaches a sensor (such as an I2C light sensor) to the device. The user may turn the sensor on or the sensor may power on automatically when connected to the interface (or when the device next wakes up from a power-saving mode and polls the interface).

The local device polls each of the one or more interfaces for connected sensors and/or actuators and identifies addresses of the sensors and/or actuators connected via the interfaces. This is typically performed when the device collects sensor readings and transmits the sensor readings to the remote server. A reason for this is that the device may enter a power-saving mode between collecting readings. Therefore, identifying sensor addresses and sending these to the server is preferably performed along with collecting sensor readings and sending these to the server. Moreover, the sensor addresses may be sent to the server when a data connection is available. Between sensor readings, the data connection may be disconnected.

The local device determines information indicating what sensors and/or actuators are connected to the interfaces and their corresponding addresses on the interfaces. This information may be added to the data set that is sent to the remote server.

The server then receives the list of addresses of connected sensors/actuators and compares them to the previous list sent by the device. If the server identifies any new addresses (in this case the I2C light sensor) it decides whether it has enough information to identify the device. For example, if there is only one type of sensor that uses the specific address used by the new sensor then the server can identify with certainty the sensor type of the new sensor. However, if multiple different sensors/actuators use the address then the server requires further information to determine the sensor type of the new sensor.

In order to determine further information, the server may send an I2C script to the local device. The I2C script may be designed specifically to confirm that a sensor is a particular sensor type. Alternatively, the script may be designed to collect data from sensors of different sensor types, so that the collected data may be used to identify the sensor type of the sensor. For example the script may collect further identification values from the sensor.

Further information gathered as a result of the test script is passed from the local device to the server. Based on which test script was sent to the device and the resulting further information, the server will narrow down the sensor type to a specific type.

If there are many different possible sensor types that all use the same address, the server may send multiple test scripts to the device to interrogate the sensor. The server may send multiple different scripts in one transmission and receive the results of all the scripts back in one transmission. Based on the results from all of the scripts, the server may determine the sensor type of the sensor. Alternatively, the server may send a first test script during a first transmission and receive the results from that script before sending another test script in a second transmission. If the data received from the device as a result of the first script is sufficient to identify the sensor type, the server may not need to send second/further test scripts to the device.

The test scripts may be configured to execute one only (in contrast to control scripts that may be scheduled to run at regular intervals).

The server may present a user interface to the user. The user may optionally be able to use the user interface to select a sensor type from a list of possible sensor types. This may be used to override a sensor type that has been automatically determined using the methods described herein.

The above methods require that suitable test scripts and control scripts are available. These scripts are specific to each sensor type (or may be suitable for a subset of sensor types). The test scripts and control scripts may be stored in a script repository accessible by the server. If the server identifies that a sensor has been connected to the device and that a suitable test script and or control script is not available for the device in question, a message may be sent to an administrator to inform them of this (e.g. if the sensor type is a new sensor type). In response, the administrator may add additional scripts to the repository. These additional scripts may need to be prepared based on the operational constraints of the new sensor type.

Once the type of sensor, the interface it is connected to and the address being used on the interface is determined, the server may send one or more appropriate I2C control scripts to the local device, depending on whether the local device already has these scripts stored in memory or not. If the device already has an appropriate control script stored (e.g. because a different sensor of the same sensor type is already connected), sending a new control script to the device may be unnecessary.

The server also sends instructions to the local device to run these scripts at the appropriate frequency.

If the server determines that a device has been removed, it may remove that sensor script from the scripts to be run and may also delete the script from the local device script store.

The server may implement procedures to detect temporary removal of a sensor, which may occur due to loose connections. In case temporary removal of a sensor is connected, the device may not react immediately. For example, a sensor script relating to a particular sensor may only be deleted from a device if the sensor is missing during two consecutive polls of the interface.

As mentioned above, the device may power down between sensor readings and there may be no active data connection between the device and the server. The data connection may only be available when the device initiates one to send sensor readings to the server. Therefore, it may not be possible for the server to independently contact the device (e.g. to send test scripts). The server may need to wait for the device to next get in touch before data can be sent to the device.

The quantity of data that can be sent to the device from the server may be limited. When the device reports a data set to the server, the server may have an opportunity to respond and send data to the device. This opportunity may be limited to a fixed number of bytes of data that can be sent to the device. As an illustrative example, the reply from the server may be limited to 200 bytes, which might be suitable to transmit around 5 test scripts to the device. Therefore, if a new sensor has been detected and there are 12 possible sensor types (with a different test script for each to confirm the sensor type), the server may select a subset of test scripts to run and send these to the device first. When the device reports the results of these test scripts, the server may process the results and determine whether any of the results confirms a definitive sensor type for the new sensor. If not, the server may send further test scripts to the device, until the sensor type has been confirmed.

As previously discussed, it is an objective to keep the power consumption of the device as low as possible. The device may have a standby current of around 10 micro Amps and a connected current of around 100 milli Amps. Therefore, it is important to keep the duration of transmit periods as short as possible. This is one reason that quantity of data that the server may transmit to the device in one transmit period is limited.

Another reason that the data is limited is that the processing resources of the device are limited. This may include the available memory of the device. Limiting the processing resources may further limit the power consumption of the device (as more memory might lead to more leakage currents and greater power consumption). Because of these limited resources, sending large quantities of data to the device at once might be problematic as the device may be unable to store all of the data. This would be wasteful as the data would need to be retransmitted to the device. It may be difficult for the server to predict how much data the device can process, because the server may be unaware what operations the device is performing and so what other processes are using the available processing resources on the device.

Acknowledgements in data transmission protocols also use additional resources (radio resources and processing resources). The devices therefore advantageously transmit data using User Datagram Protocol (UDP), which are more lightweight than alternatives such as TCP and do not require acknowledgements for receipt of data. As described above, if the server sends more data to the device than the device can process, the device will not be able to process all of the data and some of the data will be lost. As a consequence of the use of a protocol that does not require data acknowledgement, the server will have no way of knowing that the device has not received the data (apart from the fact that the device has not responded to the data as expected, which may not be expected for a while in any case). This can cause delays and errors so it is preferable to keep the volume of data transmitted to the device low so that the chance of the device being unable to process the data is low.

In view of the above constraints, it is preferable to send only one packet of data to the device at a time (the device may have insufficient memory to buffer received data from multiple packets). The device may process the data received in the packet before the next packet is received. This may conserver the resources of the device. If a script is too large to send in one packet, it may be split across several packets. Alternatives The above description relates to an I2C interface. However, the methods described could be applied to other data interfaces. The methods are especially suited to serial interfaces that operate a master/slave system. The methods could be extended to other serial protocols such as I3C, SPI, RS485 and UART.

For simplicity, the above examples methods performed by one device. However, (as mentioned earlier), there may be a plurality of devices that are all in communication with the remote server.

Moreover, the above examples refer to "the I2C interface". However, as mentioned above, there may be multiple different I2C interfaces that can be addressed separately.

An "address" may refer to a memory address. Alternatively, an "address" could be a unique identifier of a sensor on the I2C interface. Some sensors have a preconfigured address. Other sensors have multiple preconfigured address that can be selected. Selection of an address allows multiple sensors of the same type to be connected via the same interface, whilst ensuring each sensor has a unique address.

Communication between the device and the remote server is described as being a NB-IoT connection over a mobile cellular network. However, devices may communicate with the remote server in a variety of different ways, such as other mobile data protocols, power-line communication protocols, low-frequency radio transmission protocols, optical transmission protocols and many more.

The above description generally refers to controlling and provisioning sensors. However, other peripherals may be connected to the device via the one or more interfaces and controlled and provisioned using the above methods. Actuators may be controlled and configured in an analogous way. As will be appreciated by the skilled person, optional features described in relation to methods of reading data from a sensor and configuring a sensor described above may be equally applicable to methods of controlling an actuator or configuring an actuator.

The invention claimed is:

1. A method of configuring a device to read data from a sensor, the method comprising:
   determining that a sensor has been connected to an interface of the device and determining an address of the sensor, wherein the address of the sensor is indicative of a sensor type and is preconfigured or selected from multiple preconfigured addresses;
   based on the address of the sensor, identifying a sensor type of the sensor; and
   sending a control script to the device, wherein the control script comprises a set of instructions that, when executed by a processor of the device, causes the device to read sensor data from the sensor via the interface, wherein the set of instructions is specific to the identified sensor type of the sensor.

2. The method of claim 1, wherein identifying a sensor type of the sensor comprises:
   based on the address of the sensor, determining one or more possible candidate sensor types of the sensor;
   if the one or more possible candidate sensor types consists of exactly one candidate sensor type, determining that the sensor type of the sensor is the exactly one candidate sensor type;
   if the one or more possible candidate sensor types comprises a plurality of candidate sensor types, selecting a candidate sensor type of the plurality of candidate sensor types; and:
      a) sending a test script to the device, wherein the test script comprises a set of instructions that, when executed by a processor of the device, causes the device to read data (such as identifying data) from the sensor via the interface, wherein the set of instructions is specific to sensors of the selected candidate sensor type;
      b) receiving data from the device, wherein the data is read from the sensor by the device during execution of the test script;
      c) based on the data read from the sensor during execution of the test script, determining whether the sensor type of the sensor is the selected candidate sensor type, and
      d) selecting different candidate sensor types from the plurality of candidate sensor types and repeating steps a) to c) until the sensor type of the sensor has been identified.

3. The method of claim 1, wherein determining that a sensor has been connected to the interface comprises:
   receiving a first list of addresses of one or more sensors connected to the device via the interface at a first time;
   receiving a second list of addresses of one or more sensors connected to the device via the interface at a second time; and
   comparing the first and second lists of addresses to determine that a sensor has been connected to the interface between the first time and the second time.

4. The method of claim 1, further comprising:

receiving the sensor data from the device; and performing data processing on the sensor data, wherein the processing is specific to the identified sensor type of the sensor.

5. A method of configuring a device to read data from a sensor, wherein the device comprises an interface, wherein one or more sensors are connected to the device via the interface, the method comprising:

providing an indication of one or more sensors connected to the device via the interface to a remote server, wherein providing an indication of one or more sensors connected to the device via the interface to a remote server comprises sending a list of addresses of the one or more sensors connected to the device via the interface to the remote server, wherein the address of each sensor is indicative of a sensor type and is preconfigured or selected from multiple preconfigured addresses; and receiving a control script from the remote server, wherein the control script comprises a set of instructions that, when executed by a processor of the device, causes the device to read sensor data from the sensor via the interface, wherein the set of instructions is specific to the sensor type of the sensor.

6. The method of claim 5, wherein the method further comprises a) receiving a test script from the remote server, wherein the test script comprises a set of instructions that, when executed by a processor of the device, causes the device to read data from the sensor via the interface;

b) executing the test script so that data is read from the sensor via the interface; and c) sending the data to the remote server.

7. The method of claim 6, further comprising repeating steps a) to c) for a plurality of different test scripts received from the remote server.

8. The method of claim 5, wherein providing an indication of one or more sensors connected to the device via the interface to a remote server comprises:

i) sending a polling message via the interface to the one or more sensors connected to the device via the interface; and ii) receiving addresses of the one or more sensors connected to the device via the interface.

9. The method of claim 8, wherein steps i) to ii) are performed at a first time to provide a first list of addresses of one or more sensors connected to the device via the interface, wherein steps i) to ii) are further performed at a second time to provide a second list of addresses of one or more sensors connected to the device via the interface.

10. The method of claim 5, further comprising:

executing the control script so that sensor data is read from the sensor via the interface; and sending the sensor data to the remote server.

11. A server configured to perform the method of claim 1.

12. A device comprising:

a processor; and an interface, communicatively coupled to the processor configured to be one or more sensors, wherein the device is configured to perform the method of claim 5.

* * * * *